United States Patent [19]

Wesselski

[11] Patent Number: 4,765,114

[45] Date of Patent: Aug. 23, 1988

[54] EXPANDABLE PALLET FOR SPACE STATION INTERFACE ATTACHMENTS

[75] Inventor: Clarence J. Wesselski, Alvin, Tex.

[73] Assignee: The United States of America as represented by the Administrator of the National Aeronautics and Space Administration, Washington, D.C.

[21] Appl. No.: 929,875

[22] Filed: Nov. 13, 1986

[51] Int. Cl.[4] ............................................. C04H 12/18
[52] U.S. Cl. ......................................... 52/646; 52/648
[58] Field of Search ........................... 52/648, 650, 646

[56] References Cited

U.S. PATENT DOCUMENTS

| | | | |
|---|---|---|---|
| 3,364,633 | 1/1968 | Polo | 52/648 |
| 3,771,274 | 11/1973 | Vaughan | 52/648 |
| 4,070,847 | 1/1978 | Madl | 52/650 |
| 4,460,288 | 7/1984 | Schaff | 52/648 |
| 4,473,986 | 10/1984 | Zeigler | 52/648 |
| 4,667,451 | 5/1987 | Onoda | 52/646 |

Primary Examiner—Henry E. Raduazo
Attorney, Agent, or Firm—Russell E. Schlorff; John R. Manning; Edward K. Fein

[57] ABSTRACT

A foldable expandable pallet (10) having a basic square configuration. Each pallet is comprised of a plurality of struts (11, 13) joined together by node point fittings (12) to make a rigid structure. Some of the struts have hinge fittings (15) and are spring loaded to permit collapse of the module for stowage (26) and transport to a space station. Dimensions of the pallet are selected to provide convenient, closely spaced attachment points between the relatively widely spaced trusses (21, 30, 31) of a space station platform. A pallet is attached to a truss at four points: one close fitting hole (22); two oversize holes (24, 25); and a slot (23); to allow for thermal expansion/contraction and for manufacturing tolerances. Applications of the pallet include its use in rotary or angular joints (29); servicing of splints; with gridded plates (34); as instrument mounting bases; and as a roadbed (36) for a Mobile Service Center (MSC) (37).

6 Claims, 5 Drawing Sheets

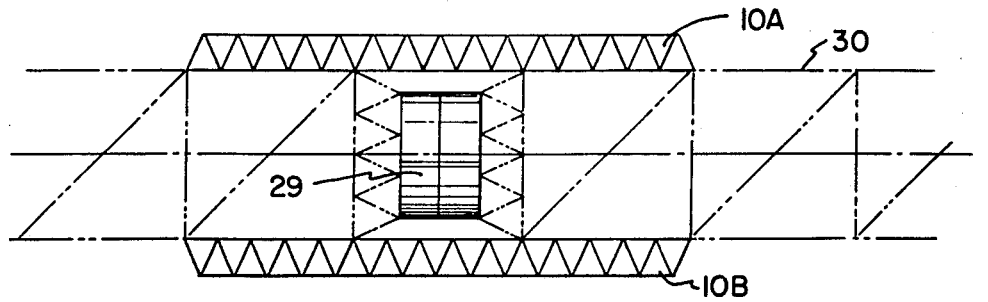
Fig. 10
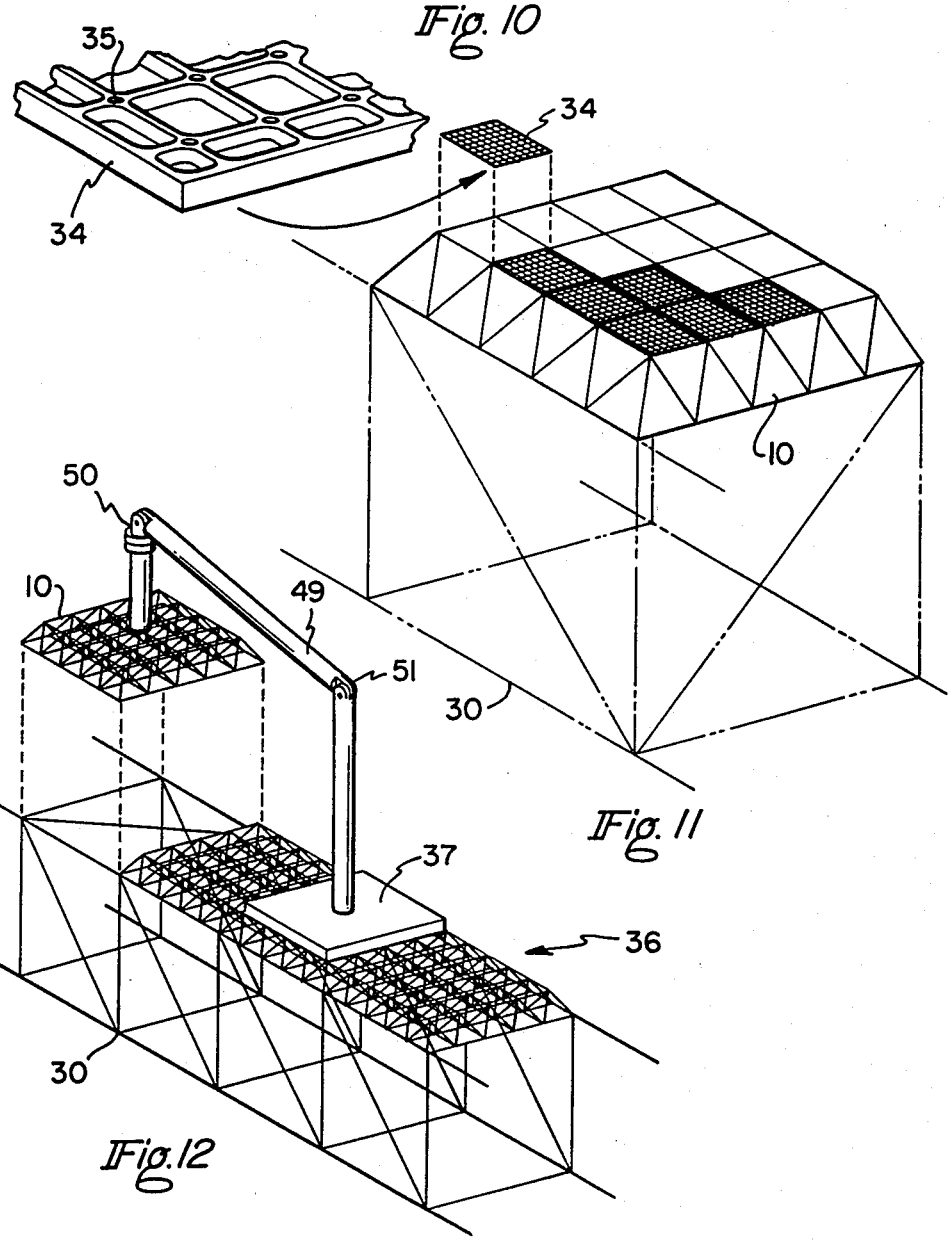
Fig. 11
Fig. 12

EXPANDABLE PALLET FOR SPACE STATION INTERFACE ATTACHMENTS

DESCRIPTION

1. Origin of the Invention

The invention described herein was made by an employee of the United States Government and may be manufactured and used by or for the Government of the United States of America for governmental purposes without the payment of any royalties thereon or therefor.

2. Technical Field

The Space Transportation System provides new opportunities for exploration of space. The capability of economically place large payloads in orbit offers the chance to perform space missions that previously were impractical. Projects presently under consideration include the construction of a space station to provide permanent manned presence in space. The prospect of such a structure provides unparalleled challenges for developing extremely efficient structural concepts and new and unique ways to fabricate and assemble such a structure.

Realistically, any mission involving constructing large structures in space in the near future must be accomplished via the space shuttle orbiter. It is therefore advantageous to develop efficient structural concepts for the maximum utilization of the shuttle payload bay and to minimize the total number of flights required. Although the space shuttle represents an improvement in orbital payload capability, it is limited to a payload of approximately thirty-eight thousand pounds in weight with a diameter of 14.5 feet and a length of sixty feet. Such limitations must be taken into consideration.

The present configuration of the space station is a "dual keel" concept wherein the main beams are square trusses that are five meters in cross-sectional height and width. It is highly desirable from a dynamics viewpoint to construct the main framing members as large as possible in order to increase the overall stiffness and hence the natural frequency. However, as the size of the main beam approaches five meters, the node points become spaced so far apart that attachment of miscellaneous components to the space station becomes difficult if not impractical. For example, the attachment of a control moment gyro which measures a meter or more in size and weighs several thousand pounds is difficult if the node point brackets are spaced 5 meters apart. Whatever attachment is used, it must be fed to at least 3 node point brackets in order for moments to be transferred to the space station. In the attachment of modules as well as small components such as rotary joints, antenna masts, miscellaneous payloads, and instrument packages of various sorts, these units must be held securely to the space station main frame. In addition the MSC (Mobile Service Center) must be able to traverse all parts of the space station on widely spaced node points of 5 meters. However, this is difficult due to the limited size of the payload that can be carried. Such attachment procedures therefore require a great variety of secondary structures that not only are difficult to stow in the payload bay but are expensive. These is therefore a need for secondary structures of common design that can be folded and stowed in the payload bay of the Orbiter and then expanded at the sapce station and placed on the main structure wherever desired and having closely spaced node points for attachment purposes. Such an interface attachment structure would serve as a vital link between all of the large and small components of the space station as well as between the Mobile Service Center (MSC) and the main structure.

3. Background Art

Tetrahedral structures in general are shown in U.S. Pat Nos. 3,221,464 and 4,521,998. Collapsible types of such structures can be seen in U.S. Pat. Nos. 3,486,279; 4,069,832; 4,393,887; 4,539,786; and 4,569,176. Specific of such units that are deployable in outer space are illustrated in for example, U.S. Pat. Nos. 4,337,560; 4,527,362; and 4,557,097. Of particular relevance to the present invention however is that structure illustrated and described in U.S. Pat. No. 4,579,302. However, none of these prior art references disclose or suggest the novel thermal compensating connector system of the present invention which allows for expansion and contraction between the truss of a space station and a foldable expandable pallet. This compensating feature of the present invention also takes into account any inherent manufacturing inaccuracies that may be present which would hinder the use of a particular component after it has been stowed and transported into outer space. Such hindrances must be avoided because limited payloads cannot afford such a luxury. The foregoing prior art references further fail to disclose or suggest the novel design of the present invention of a yoke-like node point fitting nor do they suggest the use of a foldable expandable pallet as a rotary joint transition piece, in the servicing of space station rotary joints, and as a roadbed, for example.

Much of the prior art has involved space stations having as a necessity node points that are closely spaced and this type of construction has created undesired flexural and torsional deflections resulting in severe control problems The expense of past units has been extreme and due to their large size resulted in bulky loads in the payload bay adding to the number of orbiter flights. The foldable expandable pallet of the present invention however, removes the constraint that the main structure must have closely spaced node points for attachment purposes. Thus, there is provided a structure that has widely spaced node points and yet is stiff and structurally effective. The foldable expandable pallets of the present invention also posses the advantage that they can be expanded in orbit rather than assembled as in the case of much of the prior art.

DISCLOSURE OF THE INVENTION

The present invention relates to a foldable expandable pallet having a basic square or tetrahedral configuration. Each foldable expandable pallet is comprised of a plurality of struts joined together by node point fittings to make a rigid structure. Some of the struts have hinge fittings and spring loading to permit collapse of the pallet for stowage and transport to a space station and erection on location. Dimensions of the pallet are selected to provide convenient, closely space attachment points for securely mounting components between the relatively widely spaced node points of a space station truss. The pallet is attached to the truss at four points: one close-fitting hole; two oversized holes; and a slot, to allow for thermal expansion and contraction, and for manufacturing tolerances. Applications of the pallet include its use as a transition from the truss to the rotary joint, in servicing splints, with gridded plates, as instrument mounting bases, and as a roadbed for a Mobile Service Center (MSC), and the like.

The invention also relates to a space station deployable in earth orbit comprising an elongated main truss substantially square in cross-section and having a plurality of node point connector means thereon for mounting components to the space station, a foldable expandable pallet having a plurality of foldable face struts and a plurality of non-foldable diagonal struts joints together by yoke-like node point fitting means connected thereto, pin means carried by said pallet for cooperation with and attachment to the connector means of the truss, said connector means of said truss being adapted to receive said pin means of the fitting means, the fitting means including a series of openings at least one of which approximates the diameter of the pin means to provide a close fitting relationship, at least a pair of said openings having a size exceeding the diameter of the pin means to provide a loose fitting relationship, and another of said openings being in the form of a slot in order to allow said pin means freedom of movement therein, said fitting means thereby allowing for thermal expansion and contraction between said truss and pallet.

A further feature of the present invention is a foldable expandable pallet comprising a plurality of foldable face struts and a corresponding plurality of non-foldable diagonal struts, said struts being joined together by a plurality of yoke-like node point fittings, each fitting having a bi-level configuration formed by a central support cylinder having a first set of upper level yokes projecting therefrom and a second set of lower level yokes projecting from the bottom of the cylinder, each yoke including a pair of spaced apart arms for receiving one end of each of said struts, and pin means for attaching each strut end between the arms of each said yoke.

Another concept set forth herein as a feature of the present invention will be seen to be a yoke-like node point fitting element comprising a bi-level configuration of yokes formed by a central support cylinder having a first set of a plurality of upper level yokes projecting therefrom and a second set of a plurality of lower level yokes projecting from the bottom of said cylinder, each yoke including a pair of spaced apart arms extending outwardly with respect to the axis of the cylinder and with the yokes in the upper level being in planes substantially parallel with the yokes in the lower level, each arm of each yoke having an opening therein, pin means carried releasably by each yoke in said openings for attaching members to the yokes, and a passageway extending through the element along the axis of the cylinder.

Also described herein is a method of providing closely spaced apart attachment points for mounting small components to a space station having beams with widely spaced apart attachment points comprising the steps of attaching to the space station beam at said widely spaced apart attachment points at least one foldable expandable pallet having on at least one surface thereof closely spaced apart attachment points, and securing to said surface of the pallet the small components to be mounted on the space station beam.

BRIEF DESCRIPTION OF DRAWINGS

FIGS. 6-12 are a series of similar functional representations of various uses and applications of the foldable expandable pallet in outer space.

BEST MODE FOR CARRYING OUT THE INVENTION

Figure 1:
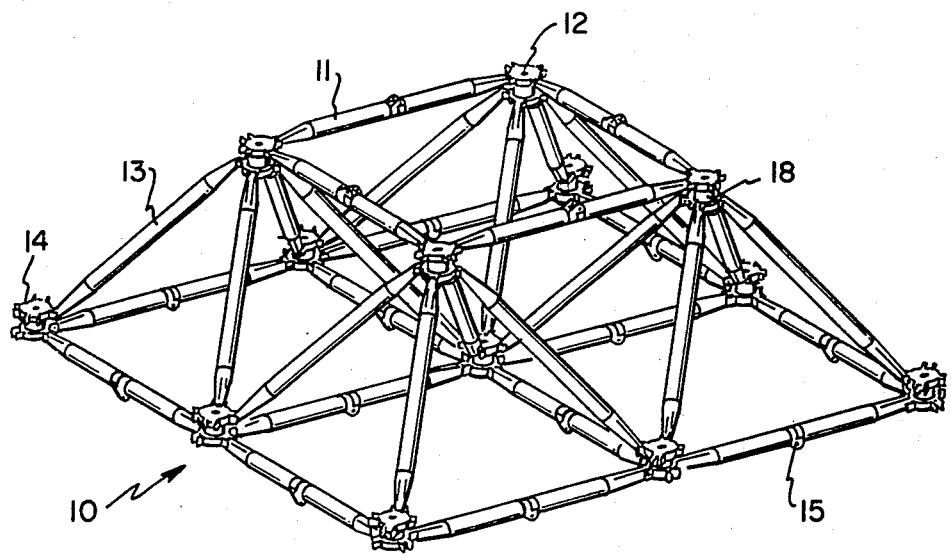
FIG. 1 is a pictorial representation of a foldable expandable pallet of the present invention shown in trimetric orientation and in its fully expanded position.
Figure 4:
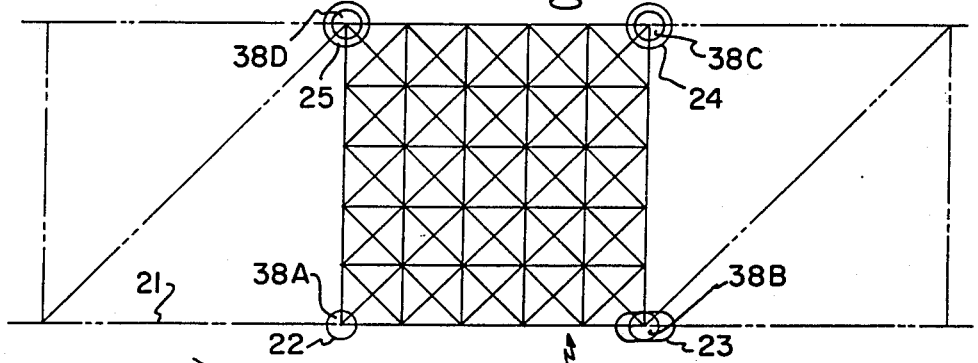
FIG. 4 is a functional representation of a truss of the space station and a foldable expandable pallet of the present invention connected thereto in the fashion taught by the invention in order to allow for thermal expansion and contraction.

In FIG. 1 there will be seen a basic unit of the foldable expandable pallet of the present invention. The pallet 10 includes a plurality of foldable face struts 11 having a hinge 15 at about midway of the length thereof. The hinge 15 is preferably of the type depicted in U.S. Pat. No. 4,579,302 (FIG. 5) which includes torsional springs to provide energy to effect expansion of foldable strut 11. The hinge 15 provides deployment energy and selflocking engagement when deployed. Once deployed in orbit, the pallet 10 forms the structural nucleus of a geometrically symmetrical structure capable of supporting a plurality of various members and performing a myriad of functions. Pallet 10 also includes a corresponding plurality of non-foldable diagonal struts 13, and with each end of each strut 13 as well as each end of each strut 11 joined to a node point fitting 12 in order to complete the structure. A central passageway 14 in each fitting 12 serves as a connecting point for joining the pallet 10 to a space station truss as will be seen hereinafter. Pin means 38 in FIG. 4 provide such a connection. Fitting 12 serves as the node point since the center lines of all of the struts that tie in at a particular fitting intersect at a common point at the fitting 12 for example. The face struts 11 are oriented 0° and 90° with respect to each other and lock when in the 0°-180° position. The diagonal struts 13 extend between the upper and lower level node point fittings of the pallet 10.

Figure 2:
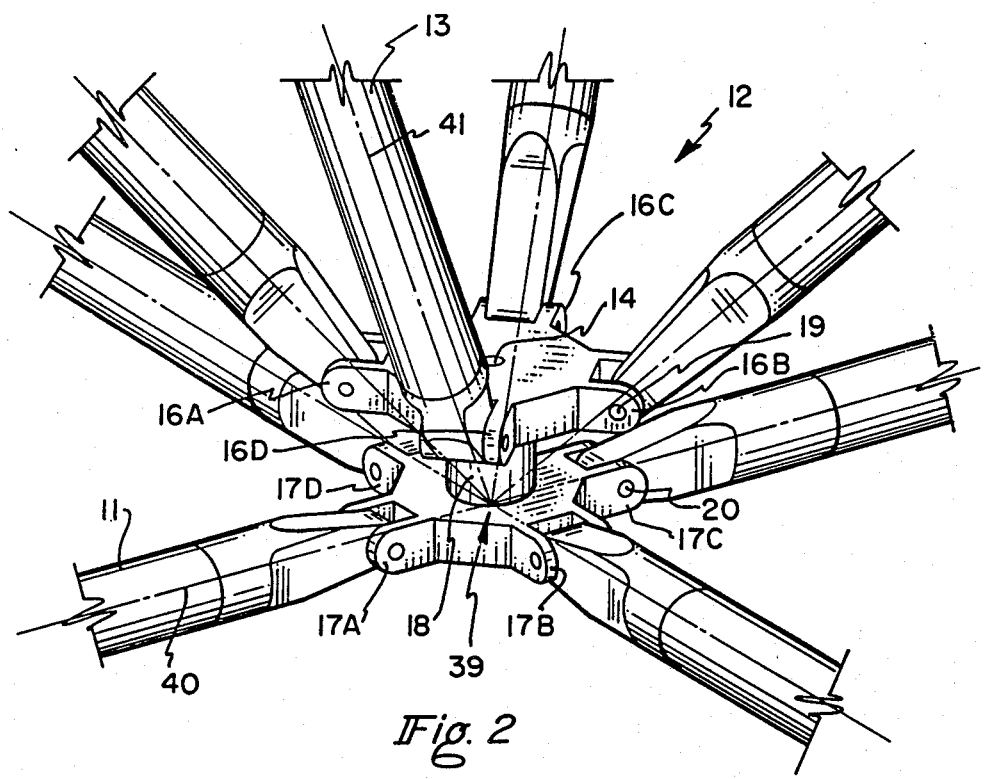
FIG. 2 is a pictorial representation of a portion of the foldable expandable pallet of FIG. 1 and showing the yoke-like node point fitting in more detail and on an enlarged scale.

In FIG. 2 the node point fitting 12 is shown on an enlarged scale and will be seen to include a central cylindrical support shaft 18 from which radiates a plurality of yokes 16A-16D and 17A-17D. Each yoke has a pair of arms with a hole at the end for the purpose of inserting and removing releasable pins 19 which function to hold in the yokes the ends of struts 11 and 13 which are received therein. A central passageway 14 extends through the fitting 12 from top to bottom and is used to attach the pallet 10 to the main beam or truss of the space station. Pins (not shown) are inserted through at least four of the openings 14 at the corners in FIG. 1 for example and the pallet 10 is secured to a desired section of the space station in this fashion. The particular detail of the attachment can be seen in FIGS. 4 and 13. Referring again to FIG. 2, a common node point 39 is shown at which point all of the strut centerlines 40 and 41 intesect in the fully expanded configuration of the pallet 10.

Figure 3:
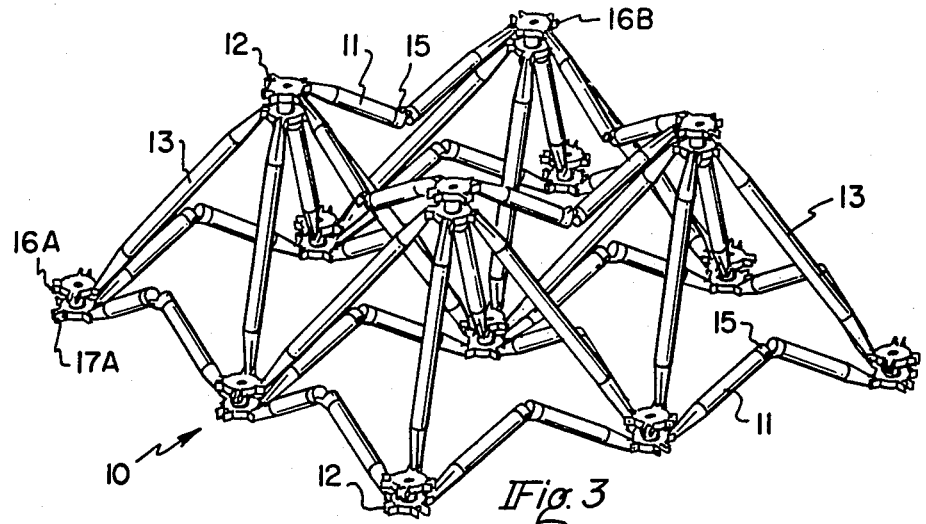
FIG. 3 is a view similar to FIG. 1 but showing the foldable expandable pallet in a partially collapsed configuration.

The pallet 10 is shown in FIG. 3 to be in a partially folded configuration. In this position all of the face struts 11 fold inwardly thus allowing the node points to be packed adjacent each other. The face struts 11 with hinge 15 are spring loaded as note above by any suitable means, and hence they naturally assume the 0°–180° position. Torsional or extension springs can be used to perform this function. In addition such spring loading provides the energy needed to expand and deploy the pallet 10 during its time of use. The pallet 10 can be equipped with other devices such as springs at the fittings 12 in order to assist in expanding the pallet and external forces can be applied to carry out the operation.

Figure 5:
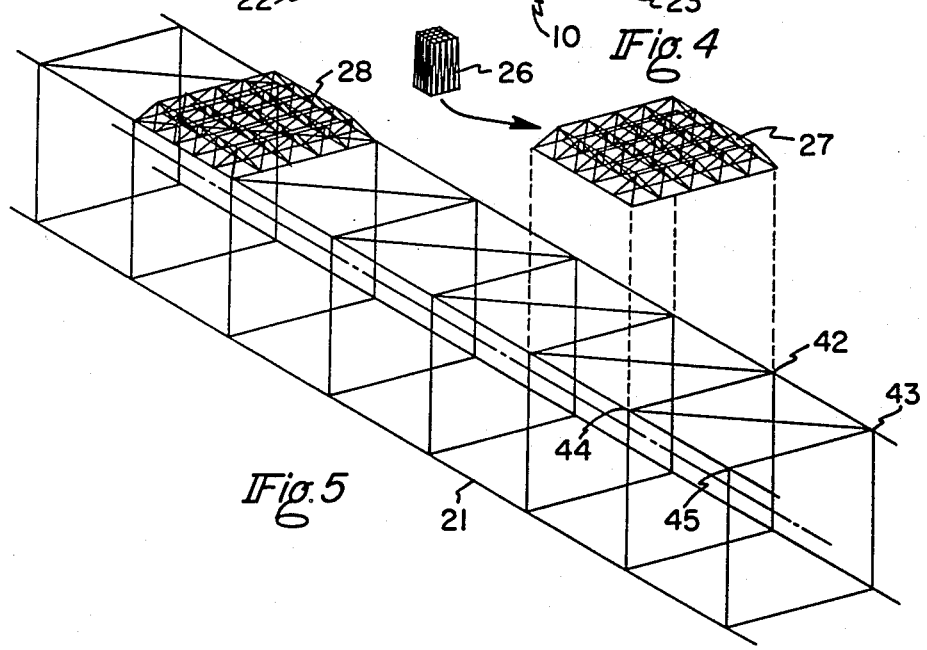
FIG. 5 is a functional representation of the various steps and procedures for attaching a foldable expandable pallet to the main truss or beam of the space station.

With reference now to FIG. 4, the pallet 10 is attached to a section of a five meter square beam 21 at four points using pins 38A–38D. The pallet includes a set of openings 22–25 for this purpose and opening 22 is sized to provide a snug fit for pin 38A. Opening 23 is an elongated slot which permits pin 38B to move or slide laterally therein. Both of apertures 24 and 25 are oversized with respect to pins 38C and 38D respectively. It has been found that this fashion of attaching the pallet 10 to the beam 21 is preferred in that it provides for thermal expansion and contraction of the pallet 10 relative to the beam 21 and vice versa, and also allows for manufacturing inaccuracies which would hinder use of the pallet 10 which cannot be tolerated because of limited payload capabilities. The basic process for installing the pallet 10 is seen in FIG. 5 wherein the pallet in its stowed configuration 26 is expanded at 27 and installed as seen at 28 at various locations desired on and along the main beam 21 of the space station. It should be noted in FIG. 5 that if one considers node points 42, 43, 44 and 45 as representative, then the objective of the pallet 10 is to provide the space station 21 with a secondary structure that includes many closely spaced node points in comparison to node points 42–45 whereby the pallet 27 can serve as a mounting base for components that could not otherwise have been used with only the existing node points 42–45. The pallets 26 in their stowed configuration can be stowed in the payload bay prior to use. Cannisters holding 24 pallets require about seven feet of payload bay length and one shuttle flight can accommodate about six cannisters. This represents 144 pallets and when expanded cover 36,000 square feet or about three-quarters of the area of a football field.

Figure 13:
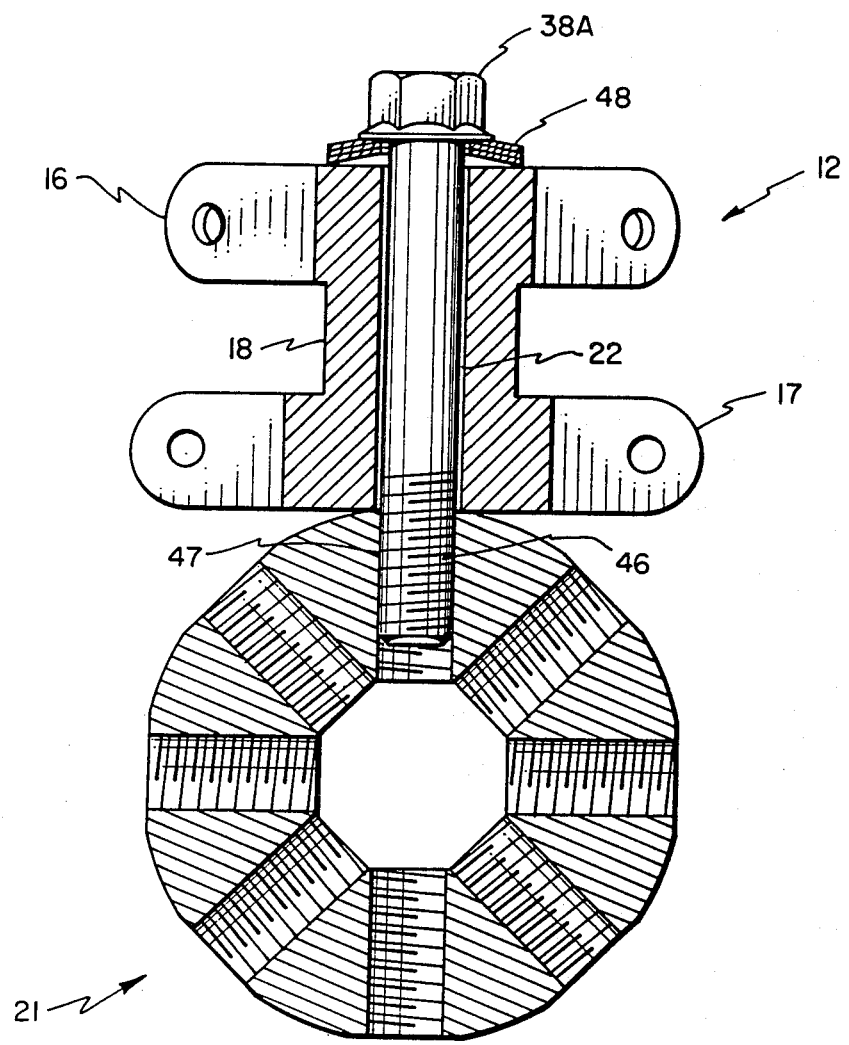
FIG. 13 is a pictorial representation partly in cross-section of the connector details of FIG. 4.

The details of the connection between the truss 21 and the pallet 10 of FIG. 4 is shown in more detail in FIG. 13. While only a single pin 38A is illustrated, it is nonetheless representative of pins 38B-D. Similarly, opening 22 in the yoke-like fitting 12 is representative of openings 23–25 of FIG. 4, for example, pins 38A–D may be bolts as illustrated in FIG. 13 or of a quick-release type if desired, otherwise the threaded end 46 of pin 38A can be seen to be received in one of the eight openings 47 of truss 21. Belleville springs 48 may be included to maintain a preload under varying thermal expansion conditions.

A primary advantage of the pallet 10 is that a designer can select the size of a main beam that will provide a stiff controllable space station and yet will have a multitude of node point attachment locations. Thus, an orthogonal pallet (face members 0° to 90° apart) has been shown to illustrate how an expansion structure can be used to span widely spaced node points on a space station main frame to yield a secondary structure that has many closely spaced node points. This is the preferred method for a square truss. However, it is also possible to span widely spaced node points by using a tetrahedral pallet. This is a type of truss where the face members are oriented 120° and 240° apart in relation to one another. This type also folds in a similar way to an orthogonal pallet.

The foldable expandable pallet has many practical uses on the space station. For example, it can function when in use as a versatile pallet for mounting and stowing miscellaneous space station components whether they are large or small. These pallets 10 can be mounted at any location on the station depending on requirements. As shown in FIGS. 4 and 5 the pallet 10 is mounted on any four adjacent node points on the main structure. It will thusly provide an array of node ponts that are much more closely spaced together. In short, the pallet 10 acts as a pegboard.

Figure 6:
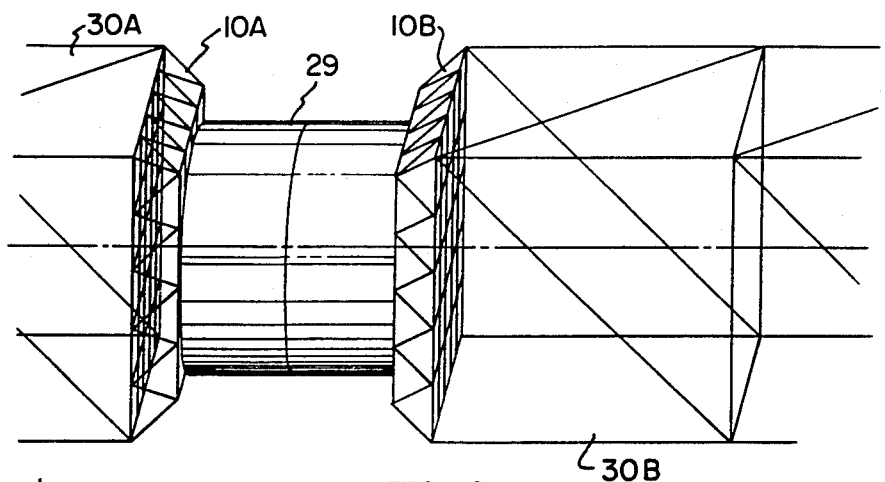

In FIG. 6 for example, a particular use of the pallet 10A and 10B can be seen where the pallets form a transistion between two main beams 30A and 30B of the space station and a rotary joint 29. The foldable expandable pallet fits on the four end nodes of the main beam and provides a multitude of closely spaced nodes for the rotary joint to be bolted. Since the rotary joint 29 is relatively small in comparison to the main beam, it would not otherwise be possible to fit it to the main structure without a transition structure or a multitude of struts.

Figure 7:
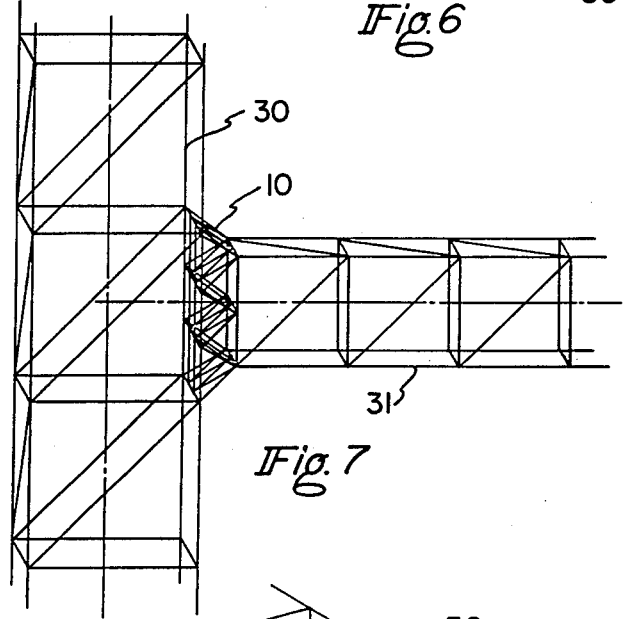
Figure 8:
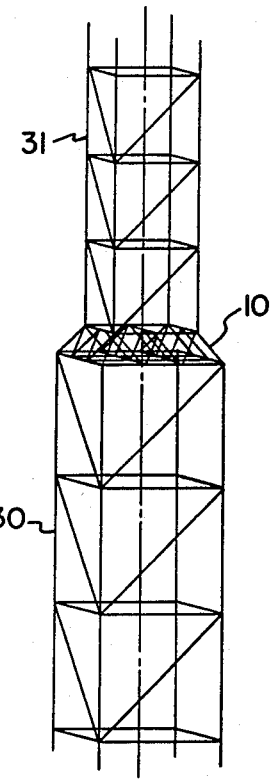

FIGS. 7–8 illustrate the use of the pallet 10 as a transistion between space station beams 30 and 31 that differ in size one from the other. FIG. 7 shows the beams at right angles to one another whereas in FIG. 8 the beams are more or less aligned. Since the node points on beams 30 and 31 do not match, some transition element such as a pallet 10 is required to make this type of connection.

Figure 9:
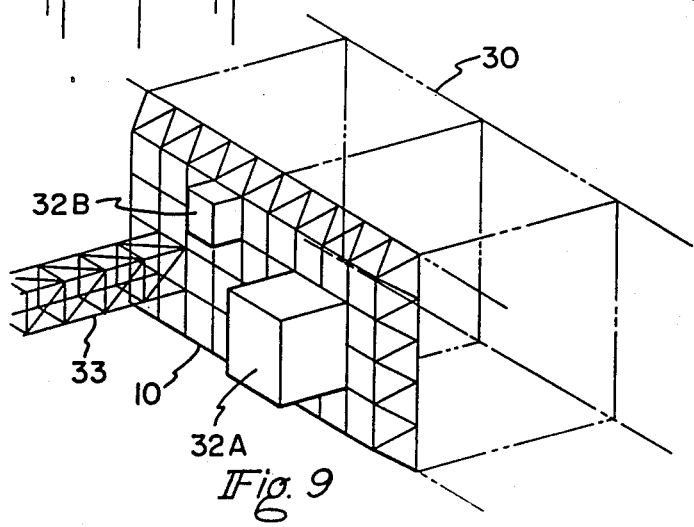

In FIG. 9, the main beam 30 carries a pallet 10 of typical design. The pallet can be continuous, extend over only a few bays or sections of the main beam 30, or it can be deployed as individual panels. Antenna masts 33 are shown in FIG. 9 and the pallet 10 provides a secure mount for attachment thereto. Instruments 32A and 32B used for earth viewing or space viewing are provided on the space station beam 30 by securely fixing these instruments to any of the several node points afforded by the pallet 10. In FIG. 10, pallets 10A and 10B are applied above and below beam 30 to serve as a splint which enables rotary joint 29 to be removed for replacment or servicing without weakening the basic construction of the beam 30.

FIG. 11 shows gridded plates 34 mounted to the foldable expandable pallet 10 which in turn is mounted to the main structure 30. Depending on design, these gridded plates 34 are 1 m by 1 m in size and have mounting holes 35 spaced several cm's apart. These plates 34 are used in places which require small objects to be fastened or as protection walls inside servicing bays.

It has been found to be extremely difficult to design an MSC (Mobile Service Center) base to traverse nodes that are 5 meters apart or more. FIG. 12 shows a schematic design where pallets 10 are installed on the main beam 30 to form a continuous roadbed 36 that has node points spaced 1 meter apart for example. This permits a simpler and more compact design for the MSC base 37. Mobile base 37 is designed to either walk on nodes or a pair of rails may be fastened onto pallet roadway 36 for the MSC 37 to ride to and fro. Arm 49 includes wrist joint 50 and elbow joint 51 for such purposes.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

I claim:

1. An interface attachment structure for the attaching of a miscellaneous component to a framing member, said framing member having a first node point attachment means spaced apart a first distance and said miscellaneous component having a second node attachment means spaced apart a second distance different from said first distance, said interface attachment structure comprising a foldable, expandable pallet bridging the framing member and having a rectangular first face for structural attachment to the framing member and being formed of a plurality of foldable face struts, being joined together by a plurality of node point fittings, at least three of said node point fittings being structurally attachable to the first node point attaching fittings of the framing member, said interface attachment structure further having a second face for structurally attaching the miscellaneous component and being formed of a plurality of foldable face struts being joined together by a plurality of node point fittings, at least some of said node point fittings being spaced to structurally attach the second node point attachment means of said miscellaneous component, and a plurality of non-foldable struts attached to the node point fittings and extending diagonally between the two faces to form a truss thereby providing strength to the pallet.

2. The structure specified in claim 1 wherein the node point fittings are bi-level with one level receiving the face struts and the other level receiving the diagonal struts.

3. The structure specified in claim 2 wherein each of the foldable face struts is provided with a spring loaded hinge means to assist in the expansion of the structure.

4. The structure specified in claim 3 wherein the structure is square and the first face is larger than the second face.

5. The structure specified in claim 4 wherein the second face is provided with a mounting base for the attachment of small miscellaneous components thereto.

6. The structure specified in claim 4 wherein the second face is provided with a gridded plate including mounting openings therein in order to fasten small objects thereto.

* * * * *